United States Patent Office 2,987,551
Patented June 6, 1961

2,987,551
PREPARATION OF CITRAL
James G. Baxter and Wilbert J. Humphlett, Rochester, N.Y., assignors to Eastman Kodak Company, Rochester, N.Y., a corporation of New Jersey
No Drawing. Filed June 6, 1958, Ser. No. 740,181
5 Claims. (Cl. 260—601)

This invention is concerned with the preparation of an acyclic aldehyde, and more particularly, to the preparation of citral.

Citral, which is also commonly called geranial, has the following structural formula:

This unsaturated aldehyde is used in the preparation of perfumes, in the preparation of β-ionone and in the preparation of other related compounds. The compound, β-ionone, is of particular interest as it is the starting material in many vitamin A syntheses. The usual natural source of citral is lemon grass oil. However, this oil is only available in sizeable quantities from markets foreign to the United States. Hence, it is desirable to have a method for preparing citral synthetically from relatively simple and readily available commercial chemicals.

It is an object of this invention to provide a new method for synthesizing citral.

It is another object of this invention to prepare citral from relatively simple and readily available compounds by a novel process.

It is also an object of this invention to provide a novel process for preparing citral necessitating a minimum of process steps.

These and other objects of the invention are accomplished by condensing acetone with a propargyl halide and thereafter condensing the resulting reaction product with a 4,4-dialkoxy-2-butanone to form the acetylenic diol acetal, 2,6 - dihydroxy-2,6-dimethyl-8-dialkoxy-4-octyne, hydrogenating the acetylenic bond of this acetylenic diol acetal to form the saturated diol acetal, 2,6-dihydroxy-2,6-dimethyl-8-dialkoxy-octane, and thereafter converted this saturated diol acetal to citral by dehydration and hydrolysis.

The initial reaction is between acetone and a propargyl halide, the following equation being illustrative of this reaction:

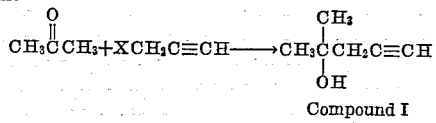

Compound I wherein X is a halogen, and preferably bromine or iodine. This initial condensation reaction can be effected in the presence of zinc. The zinc is preferably activated with iodine or iodine compounds such as methyl iodide, and copper compounds such as copper acetoacetate. Substantially anhydrous conditions are employed in this condensation reaction. The reaction is exothermic and external cooling is usually employed to control the rate of reaction. Such substantially inert solvents as diethyl ether, toluene, benzene and the like are employed in accordance with usual practice. Temperatures ranging from about room temperature up to the decomposition temperature of Compound I or the reactants, and usually the reflux temperature of the solvent are used in the reaction. The reaction is allowed to proceed until substantially all of the molar limiting reactant has reacted, reaction times usually ranging from about 15 minutes to 2 hours although the reaction time can be further varied in accordance with usual practice. The condensation of acetone with a propargyl halide in the presence of zinc forms an organo-metallic complex which readily hydrolyzes to Compound I, 4-hydroxy-4-methyl-1-pentyne, by the addition of water, dilute aqueous acid or an aqueous ammonium salt solution thereto.

Compound I is thereafter condensed with a 4,4-dialkoxy-2-butanone to form an acetylenic diol, the following equation being illustrative of this reaction:

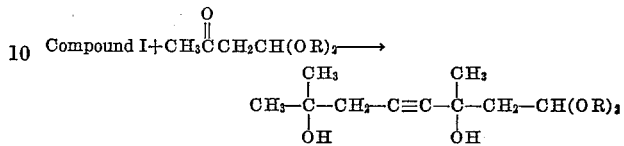

Compound II

R being an alkyl radical, preferably a lower alkyl radical containing 1 to 6 carbons such as methyl, ethyl, propyl, butyl, etc. However, the nature of the alkoxy radical of the 4,4-dialkoxy-2-butanone can be widely varied as this radical is ultimately hydrolyzed to an aldehyde radical in the subject synthesis. This condensation reaction can be effected in the presence of a Grignard compound including aryl and aliphatic Grignards, and more usually a lower alkyl magnesium bromide containing 1 to 6 carbon atoms. Typical Grignards are methyl magnesium bromide, ethyl magnesium bromide, phenyl magnesium bromide and related well-known Grignards. In accordance with usual practice, diethyl ether and related solvents are used in the Grignard reaction. The condensation with the Grignard compound is carried out in the usual manner, similar reaction conditions as are used in the initial condensation of the subject synthesis being suitable. The reaction of Compound I with a 4,4-dialkoxy-2-butanone in the presence of a Grignard forms an organo-metallic complex which readily hydrolyzes to Compound II, 2,6-dihydroxy-2,6-dimethyl-8-dialkoxy-4-octyne, by the addition of water, dilute aqueous ammonium salt solution thereto. Likewise, the organo-metallic complex formed by reacting acetone and the propargyl halide in the presence of zinc can be condensed directly with the 4,4-dialkoxy-2-butanone without decomposing this complex to form a carbinol.

The acetylenic bond in Compound II is then fully hydrogenated to produce a saturated diol acetal as illustrated by the following equation:

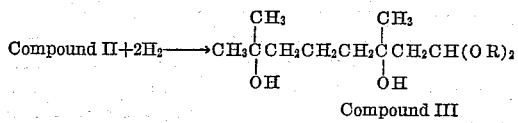

Compound III

The hydrogenation can be effected in the presence of a wide variety of hydrogenation catalysts, either at atmospheric or at superatmospheric pressures. The hydrogenation can be readily carried out at room temperature with some catalysts, and with other catalysts elevated temperatures are desirably employed. Typical hydrogenation catalysts include platinum, platinum oxide, Raney nickel, palladium and related well-known hydrogenation catalysts. The hydrogenation is carried out until the acetylenic bond is completely hydrogenated with two molar proportions of hydrogen to produce 2,6-dihydroxy-2,6-dimethyl-8-dialkoxyoctane.

By dehydrating and hydrolyzing Compound III, citral is prepared.

In a preferred embodiment of the invention Compound III is converted to citral by heating Compound III with an ionizable acid, preferably in the presence of an organic base, whereby the conversion is effected in a single reaction step. The conversion is desirably effected in a ketonic solvent; the dialkyl ketones such as acetone, methyl ethyl ketone, dimethyl ketone, methyl isopropyl ketone, diethyl ketone or the like being preferred, although other organic solvents inert to the reaction can be employed. Any of the well-known ionizable acids can be employed, although the mineral acids are preferred. Particularly efficacious results are obtained with hydrohalic acids such as hydrochloric acid, hydrobromic acid and the like. Other well-known ionizable acids which are suitable include sulfuric acid, phosphoric acid, oxalic acid, and the like. Any of the well-known organic bases can be employed in combination with the ionizable acid, the amines being desirably employed. Typical organic bases which can be suitably employed are the members of the pyridine series such as pyridine, α-picoline, β-picoline, γ-picoline, 1,2-lutidine, 1,3-lutidine, 2,4-lutidine, 2,6-lutidine, 3,6-lutidine and similar well-known pyridine bases; aniline, quinoline, piperidine, aminopyridine, morpholine, dimethylamine and similar well-known organic bases. For convenience, an acid and an organic base can be added as a single compound such as an amine hydrohalide. The dehydration and hydrolysis of Compound III to citral proceeds relatively slowly at room temperature, and thus, this conversion is preferably effected at elevated temperatures up to the decomposition of Compound III and citral, the reflux temperature of the reaction mixture ordinarily being employed. The reaction is normally complete in 1 to 3 hours at reflux although longer or shorter periods can be employed depending upon the temperature at which the conversion is effected and the particular reactants employed.

Compound III can also be converted to citral in a single reaction step by treating Compound III with a water-hydrolyzable halogenated aliphatic hydrocarbon at an elevated temperature below the decomposition temperature of Compound III and citral, and usually in the range of 50–200° C. The halogenated hydrocarbon can be a monohalogenated, dihalogenated, trihalogenated or tetrahalogenated hydrocarbon, and the halogen substituent can be any one or more of the well-known halogens such as chlorine, bromine or iodine. The fluorinated hydrocarbons are operable but less desirably employed due to handling difficulties. Typical halogenated hydrocarbons which are suitably employed include such materials as methyl bromide, methyl chloride, methyl iodide, chloroform, carbon tetrachloride, ethyl chloride, dichloroethane, ethyl bromide, ethyl iodide, trichloroethane, dibromoethane, tetrachloroethane, tetrabromoethane, allyl chloride, propyl bromide, t-butyl chloride, amyl chloride, hexyl chloride, heptyl bromide, dichlorohexane and similar well-known water-hydrolyzable halogenated hydrocarbons. The halogenated hydrocarbon can amount to as little as about 10% by weight of Compound III or two, three or more times the weight of Compound III. An excess of normally liquid halogenated hydrocarbons can also serve as the solvent for the reaction. The reaction time depends upon the other reaction conditions such as the reaction temperature, the kind and concentration of the halogenated hydrocarbon, and related variables, and can vary anywhere from a few minutes to several hours. Even though the conversion of Compound III to citral with a halogenated hydrocarbon appears to depend on hydrolysis of the halogenated hydrocarbon to a hydrohalic acid such as hydrogen chloride, water need not be added to the initial reaction mixture since the conversion appears to be initiated by traces of water present in the reactants or by a partial dehydration of Compound III by heat alone.

The diol acetal, Compound III, can also be converted to citral by a two-step process wherein Compound III is first dehydrated to the triene ether, 2,6-dimethyl-8-alkoxy-2,5,7-octatriene, and thereafter hydrolyzed to citral. This sequence of steps can be represented by the following equation:

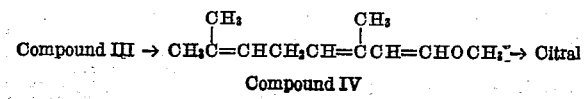

Compound IV

In converting Compound III to Compound IV an acidic halogenide free of ionizable hydrogen atoms is employed. The acidic halogenides employed are either halides or oxyhalides including such well-known acidic reagents of this type as phosphorous halides as typified by phosphorous trichloride and phosphorous pentachloride, phosphorous oxyhalides such as phosphorous oxychloride and benzene phosphorous oxydichloride, aluminum halides such as aluminum trichloride, as well as such other well-known acidic reagents as boron trifluoride, and the like. The conversion of Compound III to Compound IV is preferably carried out in solution in a tertiary amine, the members of the pyridine series being desirably employed. Typical suitable amines include pyridine itself, the lutidines, the picolines, piperidine, trimethylamine, ethyl dimethyl pyridine and the like. However, other inert organic solvents can be utilized. This conversion to the triene ether is effected under substantially anhydrous conditions as the acidic halogenides used generally react with water. Elevated temperatures up to the decomposition of Compound III and IV, and usually the reflux temperature of the solution are used to effect the dehydration. Typical reaction times range from about 15 minutes to 2 hours, although the reaction time varies with the reactants and the reaction conditions utilized.

Compound IV can thereafter be readily hydrolyzed to citral with an ionizable acid. A mineral acid such as hydrochloric, sulfuric or the like in solvent media such as acetone, methyl ethyl ketone or the like are desirably employed, although dilute aqueous acid can be employed or such well-known acids as acetic acid or the like. Elevated temperatures up to the decomposition of Compound IV and citral, and usually the reflux temperature of the solution are used to facilitate the hydrolysis. Reaction times for the conversion of Compound IV to citral range from a few minutes to one hour or longer depending on the reactants and reaction conditions.

The invention is illustrated by the following examples of preferred embodiments thereof.

*Example 1*

To 83.3 g. of zinc dust (activated with hydrochloric acid and iodine) and 0.2 g. of copper acetoacetate under anhydrous conditions was added with stirring, a solution of 40.6 g. (0.7 mole) acetone (dried over calcium chloride), and 83.3 g. (0.7 mole) propargyl bromide in 650 ml. absolute diethyl ether and 75 ml. absolute benzene over a period of 30 minutes. The vigor of the reaction was controlled by external cooling. The reaction mixture was then refluxed for 30 minutes. Aqueous hydrochloric acid (5%) was added with external cooling and the ether phase separated from the aqueous phase. The aqueous phase was saturated with sodium chloride and extracted three times with diethyl ether. The combined ether phases were washed with water, aqueous sodium bicarbonate solution and finally again with water. The ether phase was then dried over "Drierite," filtered, and the ether solvent removed by distillation through a 30 cm. column packed with glass helices. The residue was fractionated through a 15 cm. Vigreux column in vacuo giving 41.90 g. of 4-hydroxy-4-methyl-1-pentyne (Compound I), B.P. 61° at 56 mm., $n_D^{25}$ 1.4365. Infrared analysis showed a strong tertiary —OH and terminal triple bond. The compound was insoluble in water but soluble in petroleum ether ("Skelly F").

*Example 2*

In a flask were placed 40 ml. anhydrous ether followed by 267 ml. (0.6552 mole) of ethyl magnesium bromide. To this was added 30.6 g (0.312 mole) of 4-hydroxy-4-methyl-1-pentyne (Compound I), prepared as in Example 1, in 150 ml. of absolute diethyl ether over 20 minutes under anhydrous conditions. The reaction mixture was refluxed for about 3 hours and cooled to 0° C. To the cooled mixture 43.3 g. (0.3276 mole) of 4,4-dimethoxy-2-butanone in 160 ml. of absolute diethyl ether was added dropwise over 30 minutes with vigorous stirring. This suspension was stirred and refluxed for two hours. The reaction mixture was then decomposed by the addition of saturated aqueous ammonium chloride solution. The ether phase was separated from the aqueous phase and the aqueous phase extracted three times with diethyl ether. The ether phase was dried over anhydrous potassium carbonate, two drops of quinoline were added to insure basicity, and the solvent was removed giving a crude product of 71.5 g. Infrared spectrophotometry indicated an internal acetylenic bond, a hydroxyl group and 3–5% of a terminal acetylenic compound. Chromatography of the crude product on sodium aluminum silicate ("Doucil") yielded 31.4 g. of 2,6-dihydroxy-2,6-dimethyl-8-dimethoxy-4-octyne (Compound II) in the forerun and 40.3 g. in the elluted paycut having $n_D^{25}$ 1.4401. The resulting material was soluble in water and diethyl ether, insoluble in petroleum ether ("Skelly F") and contained no terminal acetylenic bond as evidenced by infrared absorption.

*Example 3*

A solution of 1.2 g. (0.005 mole) 2,6-dihydroxy-2,6-dimethyl-8-dimethoxy-4-octyne (Compound II), prepared as in Example 2, in 11.0 ml. of methanol was reduced with hydrogen at atmospheric pressure using 0.2 g. of platinum oxide as a catalyst. The hydrogen uptake was complete after six minutes. On evaporating the methanol solvent in vacuo, the product 2,6-dihydroxy-2,6-dimethyl-8-dimethoxyoctane (Compound III) was obtained in a substantially quantitative yield and had $n_D^{25}$ 1.4533. Infrared analysis showed no acetylenic bond but did show strong —OH.

*Example 4*

To 1.1 g. (0.00454 mole) of 2,6-dihydroxy-2,6-dimethyl-8-dimethoxyoctane (Compound III), prepared as in Example 3, in 21 ml. of methylethylketone was added 0.219 g. of quinoline and 0.177 g. of concentrated hydrochloric acid. The solution was refluxed for two hours, cooled and diluted with diethyl ether. The ether phase was washed two times with water, two times with dilute aqueous hydrochloric acid (5%) and two times with aqueous sodium bicarbonate solution. After drying over anhydrous sodium sulfate, the ether solution was filtered and the ether solvent evaporated leaving a residue of 0.7 g. of citral having E(1%, 1 cm.)(238 mµ)=601.

*Example 5*

To a solution of 0.81 g. (0.00346 mole) of 2,6-dihydroxy - 2,6 - dimethyl-8-dimethoxyoctane (Compound III), prepared as in Example 3, in 2.2 ml. of toluene was added 1.4 g. (0.009 mole) of phosphorous oxychloride in 2.2 ml. of toluene and 4.6 ml. of pyridine. The reaction mixture was refluxed for 35 minutes at a temperature of 106–109° C., then poured on one-half volume of ice and rinsed with diethyl ether. The resulting aqueous phase was extracted two times with diethyl ether, saturated with potassium carbonate and extracted four more times. The combined ether extracts were washed three times with aqueous hydrochloric acid (5%), two times with saturated aqueous sodium bicarbonate, two times with brine and finally four times with water. After drying over sodium sulfate the ether solvent was evaporated leaving a residue of 0.4 g. of 2,6-dimethyl-8-methoxy-2,5,7-octatriene (Compound IV) having E(1%, 1 cm.) (243 mµ)=850.

*Example 6*

To a solution of 0.34 g. of 2,6-dimethyl-8-methoxy-2,5,7-octatriene (Compound IV), prepared as in Example 5, in 2.8 ml. of acetone, one drop of concentrated hydrochloric acid was added. The solution was refluxed for fifteen minutes, cooled, taken up in diethyl ether, washed with 5% aqueous sodium bicarbonate solution and then with water. After drying over sodium sulfate, the ether solution was filtered and the solvent evaporated, leaving a residue of citral having E(1%, 1 cm.)(238mµ)=368. The semi-carbazone derivative of the product had a melting point of 130–135° C.

Thus, the present invention provides a new method for synthesizing citral. The present synthesis employs relatively simple reactants and comprises a relatively few simple process steps readily adaptable to commercial operations.

The invention has been described in detail with reference to certain preferred embodiments, but it will be understood that variations and modifications can be effected within the spirit and scope of the invention as described hereinabove and as defined in the appended claims.

We claim:
1. The method which comprises condensing acetone with propargyl bromide in the presence of zinc and forming the carbinol, 4-hydroxy-4-methyl-1-pentyne, condensing said carbinol with a 4,4-dialkoxy-2-butanone in the presence of a Grignard compound selected from the group consisting of aryl and aliphatic magnesium bromide Grignards and forming the acetylenic diol acetal, 2,6-dimethyl-2,6-dihydroxy-8-dialkoxy - 4-octyne, hydrogenating the acetylenic bond of said acetylenic diol acetal with two molar proportions of hydrogen to form the saturated diol acetal, 2,6-dihydroxy-2,6-dimethyl-8-dialkoxyoctane, and thereafter dehydrating and hydrolyzing said saturated diol acetal in the presence of a mineral acid and a tertiary organic amine to form citral.

2. The method which comprises condensing acetone with propargyl bromide in the presence of zinc and forming the carbinol, 4-hydroxy-4-methyl-1-pentyne, condensing said carbinol with a 4,4-dialkoxy-2-butanone in the presence of a Grignard compound selected from the group consisting of aryl and aliphatic magnesium bromide Grignards and forming the acetylenic diol acetal, 2,6-dihydroxy-2,6-dimethyl-8-dialkoxy-4-octyne, hydrogenating the acetylenic bond of said acetylenic diol acetal with two molar proportions of hydrogen to form the saturated diol acetal, 2,6-dihydroxy-2,6-dimethyl-8-dialkoxyoctane, dehydrating said saturated diol acetal in the presence of a phosphorous oxyhalide and a tertiary organic amine and forming the triene ether, 2,6-dimethyl-8-alkoxy-2,5,7-octatriene, and thereafter converting said triene ether to citral in the presence of a mineral acid.

3. The method which comprises condensing acetone with propargyl bromide in the presence of zinc and forming the carbinol, 4-hydroxy-4-methyl-1-pentyne, condensing said carbinol with 4,4-dimethoxy-2-butanone in the presence of a lower alkyl magnesium bromide Grignard compound and forming the acetylenic diol acetal, 2,6-dihydroxy-2,6-dimethyl-8-dimethoxy-4-octyne, hydrogenating the acetylenic bond of said acetylenic diol acetal in the presence of a hydrogenation catalyst with two molar proportions of hydrogen to form the saturated diol acetal, 2,6 - dihydroxy - 2,6 - dimethyl - 8-dimethoxyoctane, and thereafter dehydrating and hydrolyzing said saturated diol acetal in the presence of hydrochloric acid and quinoline to form citral.

4. The method which comprises condensing acetone with propargyl bromide in the presence of zinc and forming the carbinol, 4-hydroxy-4-methyl-1-pentyne, condensing said carbinol with 4,4-dimethoxy-2-butanone in the presence of a lower alkyl magnesium bromide Grignard compound and forming the acetylenic diol acetal, 2,6-dihydroxy-2,6-dimethyl-8-dimethoxy-4-octyne, hydrogenating the acetylenic bond of said acetylenic diol acetal in the presence of a hydrogenation catalyst with two molar proportions of hydrogen to form the saturated diol acetal, 2,6 - dihydroxy-2,6-dimethyl-8-dimethoxyoctane, dehydrating said saturated diol acetal in the presence of phosphorous oxytrichloride and pyridine and forming the triene ether, 2,6-dimethyl-8-methoxy-2,5,7-octatriene, and thereafter converting said triene ether to citral in the presence of hydrochloric acid.

5. The method which comprises condensing acetone with a propargyl halide in the presence of zinc and thereafter condensing the resulting reaction product with a 4,4-dialkoxy-2-butanone in the presence of a Grignard compound selected from the group consisting of aryl and aliphatic magnesium bromide Grignards and forming the acetylenic diol acetal, 2,6-dihydroxy-2,6-dimethyl-8-dialkoxy-4-octyne, hydrogenating the acetylenic bond of said acetylenic diol acetal with two molar proportions of hydrogen to form the saturated diol acetal, 2,6-dihydroxy-2,6-dimethyl-8-dialkoxy-octane, and thereafter converting said saturated diol acetal to citral by dehydrating the hydroxy groups of said saturated diol acetal to form olefinic bonds and by hydrolyzing the dialkoxy group of said saturated diol acetal to an aldehyde group.

References Cited in the file of this patent

UNITED STATES PATENTS

| | | |
|---|---|---|
| 2,540,116 | Huber et al. | Feb. 6, 1951 |
| 2,587,457 | Freed | Feb. 26, 1952 |
| 2,602,092 | Oroshnik | July 1, 1952 |
| 2,608,588 | Heilbron et al. | Aug. 26, 1952 |
| 2,676,991 | Guntrum et al. | Apr. 27, 1954 |
| 2,676,993 | Humphlett | Apr. 27, 1954 |
| 2,815,388 | Inhoffen et al. | Dec. 3, 1957 |
| 2,819,308 | Schaaf et al. | Jan. 7, 1958 |

OTHER REFERENCES

Johnson: "Acetylenic Compounds," Volume I (1946), page 195.

The Merck Index, 6th Ed. (1952) page 251.

Heilbron: "Dictionary of Organic Compounds," (1953), page 589.

Kharasch et al.: "Grignard Reactions of Nonmetallic Substances" (1954), pages 316, 317, 326, 327.